US012776804B2

(12) United States Patent
Ishihara et al.

(10) Patent No.: US 12,776,804 B2
(45) Date of Patent: Oct. 27, 2026

(54) TRANSMISSION CIRCUIT

(71) Applicants: TOKYO INSTITUTE OF TECHNOLOGY, Tokyo (JP); KYOCERA Corporation, Kyoto (JP)

(72) Inventors: Noboru Ishihara, Tokyo (JP); Shinsuke Tsuru, Kirishima (JP); Shinji Isoyama, Yokohama (JP); Tatsuo Toba, Hayama-machi (JP)

(73) Assignees: TOKYO INSTITUTE OF TECHNOLOGY, Tokyo (JP); KYOCERA CORPORATION, Kyoto (JP)

( * ) Notice: Subject to any disclaimer, the term of this patent is extended or adjusted under 35 U.S.C. 154(b) by 213 days.

(21) Appl. No.: 18/838,608

(22) PCT Filed: Feb. 6, 2023

(86) PCT No.: PCT/JP2023/003855
§ 371 (c)(1),
(2) Date: Aug. 15, 2024

(87) PCT Pub. No.: WO2023/162654
PCT Pub. Date: Aug. 31, 2023

(65) Prior Publication Data

US 2025/0150114 A1 May 8, 2025

(30) Foreign Application Priority Data

Feb. 25, 2022 (JP) ................................ 2022-028637

(51) Int. Cl.
*H03H 7/38* (2006.01)
*H03H 7/18* (2006.01)
*H04B 1/59* (2006.01)

(52) U.S. Cl.
CPC ..................................... *H04B 1/59* (2013.01)

(58) Field of Classification Search
None
See application file for complete search history.

(56) References Cited

U.S. PATENT DOCUMENTS 6,920,315 B1 * 7/2005 Wilcox ................. H01Q 1/521 455/107
6,961,368 B2 * 11/2005 Dent ..................... H04B 1/005 375/295

(Continued)

FOREIGN PATENT DOCUMENTS

JP 2005323223 A 11/2005

OTHER PUBLICATIONS

CN 110971207, Luo et al., An Impedance Tuning Device, Antenna Device and Terminal, Apr. 7, 2020, whole document.*

(Continued)

*Primary Examiner* — Tuan A Tran
(74) *Attorney, Agent, or Firm* — HAUPTMAN HAM, LLP

(57) ABSTRACT

A transmission circuit includes a plurality of impedance circuits having an impedance different from each other, a plurality of switch elements, each of which is connected to a corresponding one of the plurality of impedance circuits, and a control circuit configured to control opening and closing of the plurality of switch elements. The control circuit can control, by selectively changing the opening and closing of the plurality of switch elements, a reflection coefficient of an output terminal on an antenna side to rotate in a complex plane and on a circle that is distorted in comparison to a perfect circle.

5 Claims, 10 Drawing Sheets

1

(56) References Cited

U.S. PATENT DOCUMENTS

| | | | | |
|---|---|---|---|---|
| 7,555,276 | B2 * | 6/2009 | Wilcox | H01P 1/185<br>455/24 |
| 7,796,016 | B2 | 9/2010 | Fukuda | |
| 8,233,851 | B2 * | 7/2012 | Jeon | H03F 1/56<br>455/114.2 |
| 8,923,783 | B2 * | 12/2014 | Ashizuka | H04B 1/0458<br>333/176 |
| 8,971,218 | B2 * | 3/2015 | Shor | H03H 7/38<br>370/276 |
| 9,325,062 | B2 * | 4/2016 | Pajona | H03H 7/40 |
| 9,634,366 | B2 * | 4/2017 | Murase | H01P 1/15 |
| 9,673,844 | B2 * | 6/2017 | Pecen | H01Q 1/52 |
| 9,972,903 | B2 * | 5/2018 | Makita | H04B 1/0458 |
| 10,002,266 | B1 | 6/2018 | Hyde et al. | |
| 10,715,097 | B2 * | 7/2020 | Harada | H03H 9/0566 |
| 10,862,440 | B2 * | 12/2020 | Kamitani | H03F 3/19 |
| 11,245,386 | B2 * | 2/2022 | Tokuda | H01P 1/201 |
| 11,387,542 | B2 * | 7/2022 | Kobayashi | H04B 1/70753 |
| 11,552,612 | B2 * | 1/2023 | Morii | H03H 11/30 |
| 11,671,127 | B2 * | 6/2023 | Ke | H01Q 1/243<br>455/114.2 |
| 11,811,384 | B2 * | 11/2023 | Morii | H01J 37/32183 |
| 12,294,338 | B2 * | 5/2025 | Akamine | H03F 1/565 |
| 2005/0253688 | A1 | 11/2005 | Fukuda | |
| 2007/0049352 | A1 | 3/2007 | Nakajima et al. | |
| 2011/0189964 | A1 | 8/2011 | Jeon et al. | |
| 2014/0120852 | A1 | 5/2014 | Ashizuka | |
| 2015/0214985 | A1 | 7/2015 | Lee et al. | |
| 2018/0234080 | A1 | 8/2018 | Shrivastava | |
| 2019/0020313 | A1 | 1/2019 | Perreault et al. | |
| 2019/0089396 | A1 | 3/2019 | Kim et al. | |
| 2020/0328496 | A1 * | 10/2020 | Kobayashi | H03H 7/18 |
| 2021/0143850 | A1 * | 5/2021 | Ke | H01Q 1/243 |
| 2022/0060202 | A1 | 2/2022 | Nisbet et al. | |
| 2022/0182025 | A1 * | 6/2022 | Akamine | H03F 1/565 |
| 2023/0088706 | A1 * | 3/2023 | Morii | H01J 37/32183<br>333/32 |
| 2023/0189910 | A1 | 6/2023 | Burkhardt | |
| 2023/0361793 | A1 * | 11/2023 | Ishihara | H04B 1/04 |
| 2023/0379037 | A1 * | 11/2023 | Ishihara | H04B 7/0868 |
| 2023/0403043 | A1 * | 12/2023 | Ishihara | G06K 19/07749 |
| 2025/0158644 | A1 | 5/2025 | Ishihara et al. | |

OTHER PUBLICATIONS

Firrao Ettore Lorenzo et al, “Hardware Implementation Overhead of Switchable Matching Networks”, IEEE Transactions on Circuits and Systems I: Regular Papers, May 1, 2017, pp. 1152-1163, vol. 64, No. 5, XP011647163, IEEE, US, 12pp.

Henry G Follingstad, “Complete Linear Characterization of Transistors from Low Through Very High Frequencies”, Ire Transactions on Instrumentation, Mar. 1, 1957, pp. 49-63, vol. I-10, No. 1, XP011259259, IEEE, USA, 15pp.

* cited by examiner

TRANSMISSION CIRCUIT

CROSS-REFERENCE TO RELATED APPLICATIONS

This application is a national stage entry according to 35 U.S.C. 371 of PCT Application No. PCT/JP2023/003855 filed on Feb. 6, 2023, which claims priority to Japanese Patent Application No. 2022-028637, filed on Feb. 25, 2022.

TECHNICAL FIELD

The present disclosure relates to a transmission circuit.

BACKGROUND OF INVENTION

A backscatter system is known as a data communication method for wireless communication devices. For example, Patent Document 1 discloses a technique to achieve a single sideband by suppressing either an upper sideband (USB) signal or a lower sideband (LSB) signal using a demultiplexer/multiplexer.

CITATION LIST

Patent Literature

Patent Document 1: JP 2005-323223 A

SUMMARY

A transmission circuit according to an aspect of the present disclosure is a transmission circuit configured to be connected to an antenna. The transmission circuit includes a plurality of impedance circuits having an impedance different from each other, a plurality of switch elements, each of which is connected to a corresponding one of the plurality of impedance circuits, and a control circuit configured to control opening and closing of the plurality of switch elements. The control circuit can control, by selectively changing the opening and closing of the plurality of switch elements, a reflection coefficient of an output terminal on a side of the antenna to rotate in a complex plane and on a circle that is distorted in comparison to a perfect circle.

DESCRIPTION OF EMBODIMENTS

Hereinafter, an embodiment of the present disclosure will be described in detail with reference to the accompanying drawings. Note that the present disclosure is not limited by this embodiment, and when there is more than one embodiment, the present disclosure includes combinations of the individual embodiments. In the following embodiments, the same reference signs are assigned to the same portions and redundant descriptions thereof will be omitted.

EMBODIMENT

Figure 1:
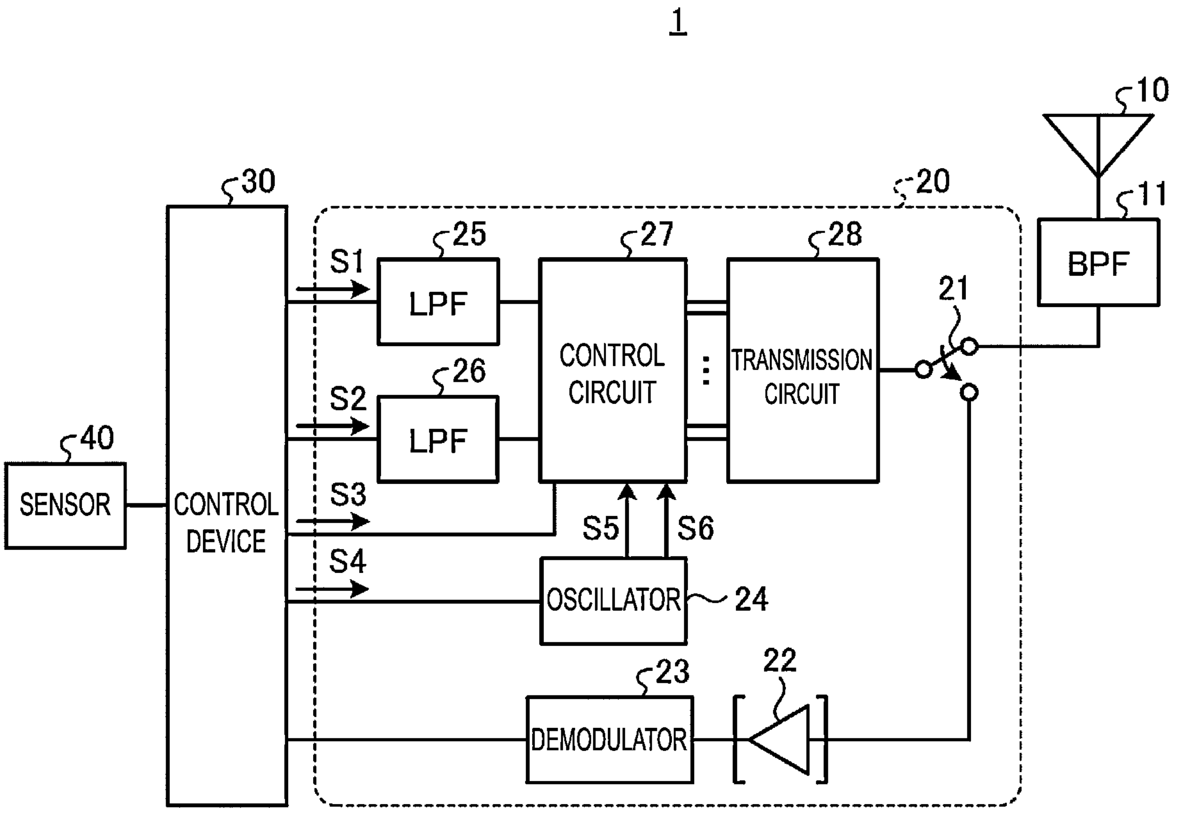
FIG. 1 is a block diagram illustrating an example of a configuration of a wireless communication device according to an embodiment.

A configuration of a wireless communication device according to the embodiment will be described with reference to FIG. 1. FIG. 1 is a block diagram illustrating an example of a configuration of the wireless communication device according to the embodiment.

As illustrated in FIG. 1, a wireless communication device 1 includes an antenna 10, a band pass filter (BPF) 11, a radio frequency backscatter (RFBS) device 20, a control device 30, and a sensor 40. The wireless communication device 1 is a communication device configured to perform backscatter wireless communication such as RFID.

The antenna 10 receives signals transmitted to the wireless communication device 1. The antenna 10 transmits radio waves towards the outside of the wireless communication device 1. The BPF 11 is a filter configured to pass signals in a desired frequency band.

The RFBS device 20 includes a radio frequency switch 21, an amplifier 22, a demodulator 23, an oscillator 24, a low-pass filter (LPF) 25, an LPF 26, a control circuit 27, and a transmission circuit 28. The RFBS device 20 is a wireless communication device that supports backscatter data communication. The backscatter data communication utilizes reflection of transmitted radio waves to perform communication.

The radio frequency switch 21 switches connection between the antenna 10 and a transmission circuit system or a receiving circuit system. The radio frequency switch 21 can connect the transmission circuit system to the antenna 10. The wireless communication device 1 transmits signals when the antenna 10 and the transmission circuit system are connected to each other. The radio frequency switch 21 can connect the receiving circuit system to the antenna 10. The transmission circuit system includes the oscillator 24, the LPF 25, the LPF 26, the control circuit 27, and the transmission circuit 28. The receiving circuit system includes the amplifier 22 and the demodulator 23.

The amplifier 22 amplifies and outputs a signal received from the antenna 10. The amplifier 22 outputs the amplified signal to the demodulator 23. The demodulator 23 performs a demodulation processing on the input signal. The demodulator 23 demodulates the signal received from the amplifier 22. For example, the demodulator 23 performs the demodulation processing on the signal received from the amplifier 22 (a modulated signal such as amplitude shift keying (ASK)).

In the control device 30, for example, a program stored therein is executed by a processor or the like, using a random access memory (RAM) or the like as a work area. The control device 30 may be a controller. The control device 30 may also be implemented by an integrated circuit such as an application specific integrated circuit (ASIC) or a field programmable gate array (FPGA). The control device 30 may be implemented by a combination of software and hardware.

The control device 30 outputs a serial data S1 to the control circuit 27 via the LPF 25. The serial data S1 is based on an output data from the sensor 40. The control device 30 outputs a serial data S2 to the control circuit 27 via the LPF 26. The serial data S2 is based on the output data from the sensor 40. The serial data S1 has a phase different from that of the serial data S2 by approximately 90°.

The control device 30 outputs a control signal S3 to the control circuit 27. The control signal S3 may be utilized to suppress either a USB signal or an LSB signal with respect to a carrier signal. The control device 30 outputs a control signal S4 to the oscillator 24. The control signal S4 may be utilized to control a channel used for communication.

The sensor 40 detects various physical quantities. The physical quantities detected by the sensor 40 are not limited to any specific physical quantities. The sensor 40 may include, for example, a temperature sensor configured to detect a temperature around the wireless communication device 1 and/or an acceleration sensor configured to detect acceleration occurring in the wireless communication device 1. The sensor 40 may include other sensors.

The oscillator 24 generates an oscillation signal of a predetermined frequency. The oscillator 24 generates an oscillation signal S5 in accordance with the control signal S4. The oscillator 24 generates an oscillation signal S6 having a phase different from that of the oscillating signal S5 by 90°.

The control circuit 27 controls the transmission circuit 28. The control circuit 27 controls the transmission circuit 28 to adjust an impedance value of the transmission circuit 28, based on the serial data S1, the serial data S2, and the control signal S3. The control circuit 27 changes the impedance of the transmission circuit 28. Due to the change in impedance, a reflection coefficient of an output terminal on the antenna 10 side rotates in a complex plane. The control circuit 27 controls, by changing the impedance of the transmission circuit 28, the reflection coefficient of the output terminal to rotate in the complex plane. For example, the control circuit 27 controls the impedance of the transmission circuit 28 to implement a single sideband by reducing the USB signal or the LSB signal with respect to the carrier signal in a reflected signal (hereinafter also referred to as a backscatter signal).

Figure 2:
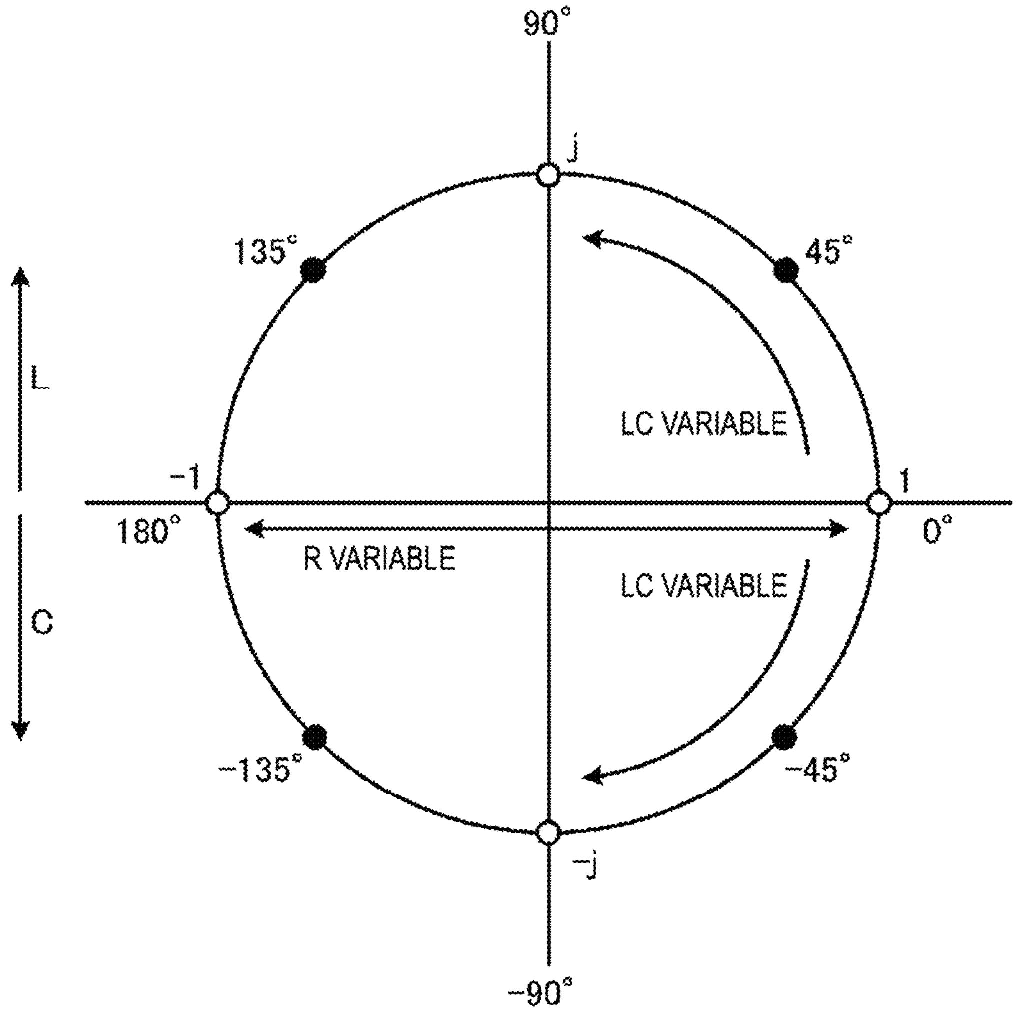
FIG. 2 is a diagram for explaining a method of controlling rotation of impedance in a complex plane according to the embodiment.

With reference to a polar chart (polar coordinates) in FIG. 2, a method in which the control circuit 27 controls the reflection coefficient of the output terminal on the antenna 10 side of the transmission circuit 28 to rotate on a complex plane of the polar chart will be described. FIG. 2 is a diagram for explaining a method in which the control circuit 27 controls, by changing the impedance of the transmission circuit 28, the reflection coefficient of the output terminal of the transmission circuit 28 to rotate.

FIG. 2 is a diagram illustrating changes in a reflection coefficient Γ due to changes in the impedance, on the polar chart. The impedance is calculated by the following Equation (1). In Equation (1), Z is impedance, R is resistance, j is an imaginary number, ω is an angular frequency, L is inductance, and C is capacitance.

$$Z = R + j(\omega L - 1/\omega C) \tag{1}$$

The reflection coefficient Γ is represented by the following Equation.

$$\Gamma = (Z - Z_0)/(Z + Z_0) \tag{2}$$

Here, $Z_0$ is impedance of the antenna 10 or the BPF 11.

The control circuit 27 selectively controls the impedance Z so as to control the reflection coefficient Γ to rotate around a reference point. The reference point may be, but is not limited to, the origin and may be any point. The closer to the origin the reference point is, the better the transmission circuit can obtain a signal close to an ideal signal. The more the control is performed to cause the periphery of the reference point to be circular, the better the transmission circuit can obtain a signal close to the ideal signal. On the Smith chart, a lower semicircular region indicates capacitive properties, and an upper semicircular region indicates inductive properties. A change on the real axis represents a change in a resistance value.

The control circuit 27 can selectively control a plurality of impedances included in the transmission circuit 28. For example, the control circuit 27 controls the impedance of the transmission circuit 28 in 45° increments of 0°, 45°, 90°, 135°, 180°, −135°, −90°, and −45°. The control circuit 27 can control the impedance to rotate discretely by sequentially changing the impedance of the transmission circuit 28. The control circuit 27 discretely rotates the reflection coefficient Γ by discretely rotating the impedance.

Figure 3A:
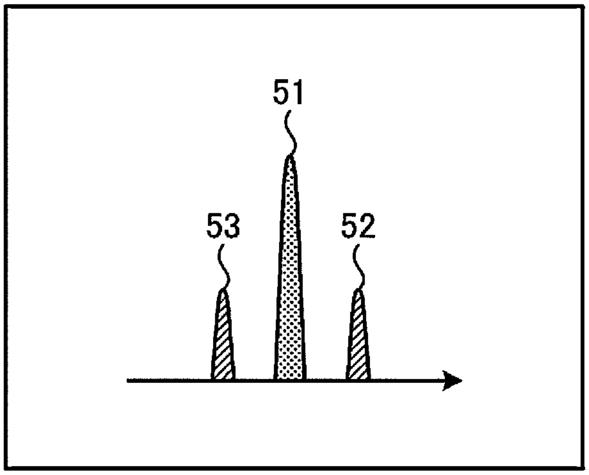
FIG. 3A is a diagram for explaining changes in a backscatter signal.
Figure 3B:
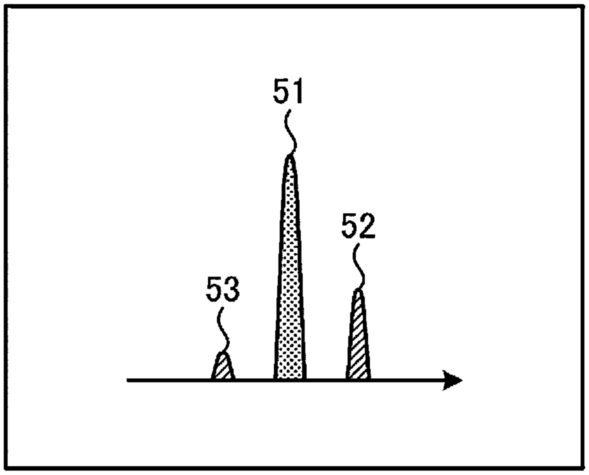
FIG. 3B is a diagram for explaining changes in the backscatter signal.
Figure 3C:
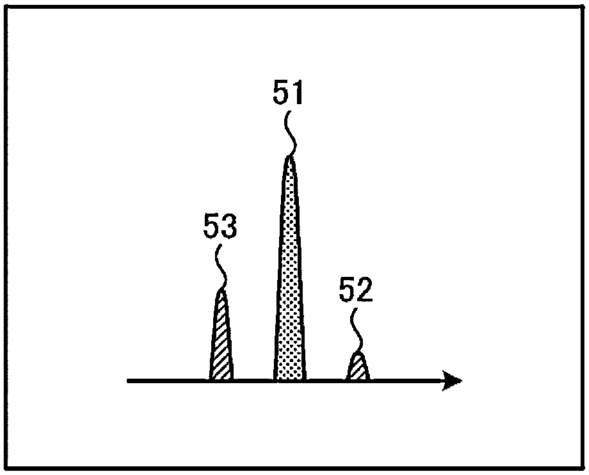
FIG. 3C is a diagram for explaining changes in the backscatter signal.

The control circuit 27 can change the impedance counterclockwise in accordance with the order of changing the impedance of the transmission circuit 28. The control circuit 27 can change the reflection coefficient Γ counterclockwise by rotating the impedance counterclockwise. When the reflection coefficient is controlled to rotate counterclockwise, the reflected signal for the radio frequency (RF) is only the upper sideband (USB) signal. When the reflection coefficient is controlled to rotate clockwise, only the low sideband (LSB) signal is obtained. At that time, the frequency of the reflected signal is detuned from the RF signal frequency by a rotational speed frequency. FIGS. 3A, 3B, and 3C are used to explain several examples of changes in the backscatter signal by changing the impedance to control the reflection coefficient.

FIG. 3A is a diagram illustrating a frequency spectrum for explaining a state of the backscatter signal when the control circuit 27 controls only a resistive component of the impedance to change the reflection coefficient Γ on the real axis of the polar chart (FIG. 2). The horizontal axis represents the frequency, and the vertical axis represents the intensity of the RF signal and the reflected signal. FIG. 3A illustrates a carrier signal 51, a USB signal 52, and an LSB signal 53. When the resistive component is controlled, the reflection coefficient Γ is controlled to be either 0° or 180° on the real axis. When the reflection coefficient Γ is controlled by changing the impedance only with the resistive component, as illustrated in FIG. 3A, for example, when switching from 0° to 180°, a clockwise signal component and a counterclockwise signal component are included. The signal components in the two rotational directions are present, and thus the USB signal 52 and the LSB signal 53 appear simultaneously, and only one of the signals cannot be selectively suppressed. As a result, an SSB signal cannot be obtained by controlling only the resistive component.

FIG. 3B is a diagram illustrating a frequency spectrum for explaining changes in the backscatter signal when the control circuit 27 changes the inductance/capacitance of the impedance to perform control so that the locus of the reflection coefficient Γ becomes circular. The horizontal axis represents the frequency, and the vertical axis represents the intensity of the RF signal and the reflected signal. Based on Equations (1) and (2), the control circuit 27 can control the impedance to rotate counterclockwise by controlling the value of the inductance. At this time, the impedance is rotated counterclockwise, for example, from 0° to 45°, 90°, and 135°. The control circuit 27 can further control the impedance to rotate counterclockwise by controlling the value of the capacitance. At this time, the impedance is rotated counterclockwise, for example, from 180° to −135°, −90°, and −45°. As illustrated in FIG. 3B, the control circuit 27 can reflect the transmitted RF signal while suppressing the LSB signal 53 by controlling the impedance to rotate counterclockwise. In other words, by controlling counterclockwise rotation of impedance, the control circuit 27 can obtain a backscatter signal in which the USB signal 52 is selected as the SSB signal.

FIG. 3C is a diagram illustrating a frequency spectrum for explaining changes in the backscatter signal when the control circuit 27 changes the capacitance/inductance of the impedance to perform control so that the locus of the reflection coefficient Γ becomes circular. The horizontal axis represents the frequency, and the vertical axis represents the intensity of the RF signal and the reflected signal. Based on Equations (1) and (2), the control circuit 27 can control the impedance to rotate clockwise by controlling the value of the capacitance. At this time, the impedance is rotated clockwise, for example, from 0° to −45°, −90°, and −135°. The control circuit 27 can further control the impedance to rotate clockwise by controlling the value of the inductance. At this time, the impedance is rotated clockwise, for example, to 180°, 135°, 90°, and 45°. As illustrated in FIG. 3C, the control circuit 27 can reflect the transmitted RF signal while suppressing the USB signal 52 by controlling the impedance to rotate clockwise. In other words, by controlling clockwise rotation of the impedance, the control circuit 27 can obtain a backscatter signal in which the LSB signal 53 is selected as the SSB signal.

The transmission circuit 28 is disposed at a front end of the wireless communication device 1. The transmission circuit 28 is a circuit configured to perform backscatter communication in which the transmitted radio waves are reflected as backscatter signals. The transmission circuit 28 is connected to the antenna 10. The transmission circuit 28 includes a plurality of impedance circuits having an impedance different from each other. Each of the plurality of impedance circuits includes a switch element. The switch element switches connection of the corresponding impedance circuit. The control circuit 27 switches connection of each of the plurality of impedance circuits by controlling a corresponding one of the plurality of switch elements. The control circuit 27 controls the impedance of the transmission circuit 28 by controlling the plurality of switch elements.

Configuration of Transmission Circuit

A configuration of the transmission circuit according to the embodiment will be described with reference to FIG. 4.

Figure 4:
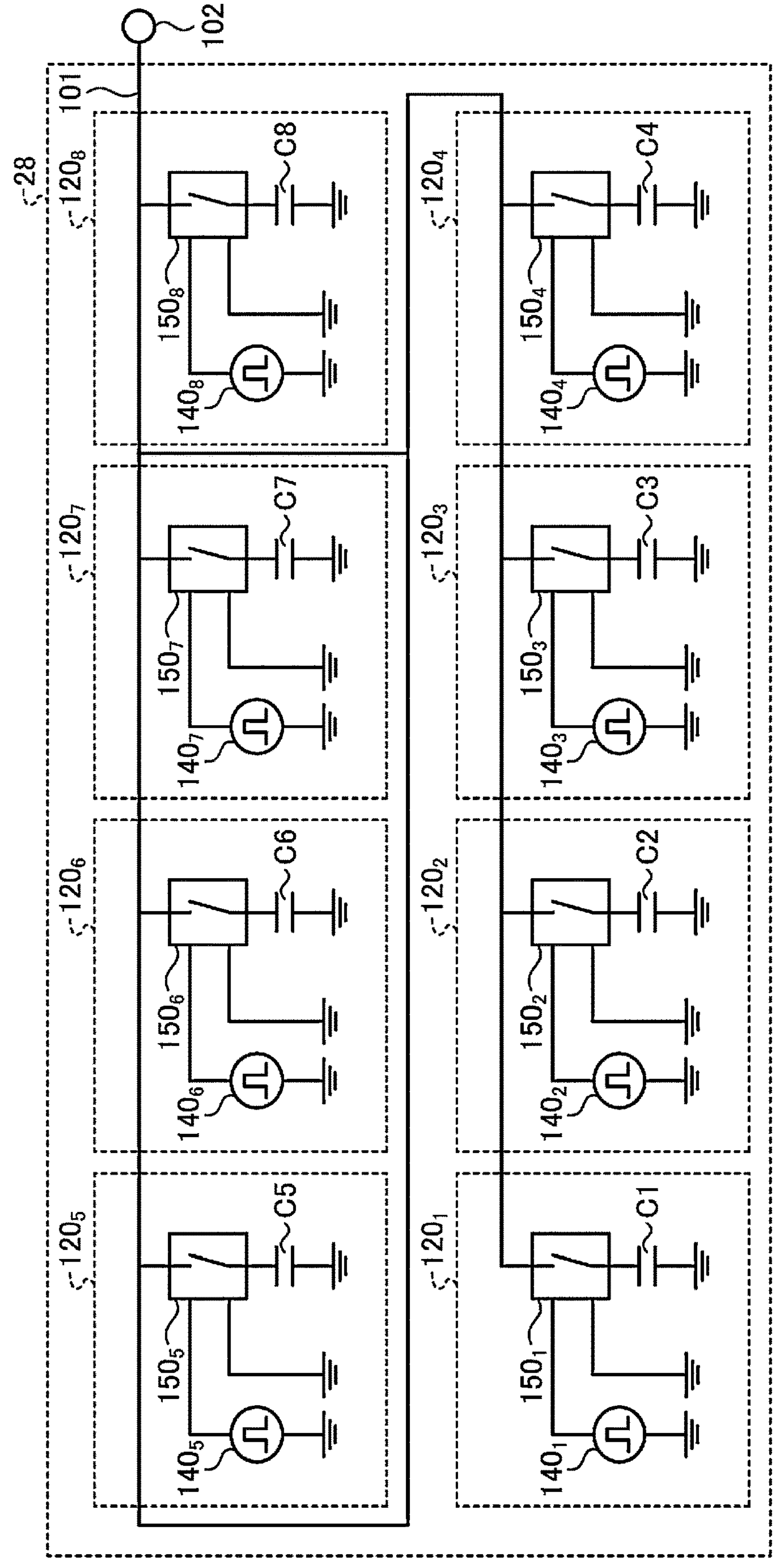
FIG. 4 is a diagram illustrating an example of a configuration of a transmission circuit according to the embodiment.

FIG. 4 is a diagram illustrating an example of the configuration of the transmission circuit according to the embodiment.

As illustrated in FIG. 4, the transmission circuit 28 includes a capacitor circuit 120$_1$, a capacitor circuit 120$_2$, a capacitor circuit 120$_3$, a capacitor circuit 120$_4$, a capacitor circuit 120$_5$, a capacitor circuit 120$_6$, a capacitor circuit 120$_7$, and a capacitor circuit 120$_8$. Each of the capacitor circuits 120$_1$ to 120$_8$ is a type of the impedance circuit. When it is not necessary to particularly distinguish the capacitor circuits 120$_1$ to 120$_8$ from one another, these may be collectively referred to as capacitor circuits 120. In FIG. 4, components less relevant to the present disclosure are omitted.

The capacitor circuit 120$_1$ includes a signal source 140$_1$, a switch element 150$_1$, and a capacitor C1. The signal source 140$_1$ indicates a signal source to which the control signal from the control circuit 27 is supplied. The signal source 140$_1$ outputs the control signal to the switch element 150$_1$ to control an opening/closing operation of the switch element 150$_1$. The switch element 150$_1$ includes one input terminal to which the signal source 140$_1$ is connected and the other input terminal to which a reference potential is connected. The reference potential is described as being the ground, but the present disclosure is not limited thereto. The switch element 150$_1$ switches between a closed state (on state) and an open state (off state) in accordance with the control signal from the signal source 140$_1$.

The switch element 150$_1$ includes one end to which a signal line 101 is electrically connected and the other end to which one end of the capacitor C1 is electrically connected. The other end of the capacitor C1 is connected to the reference potential. In this case, the switch element 150$_1$ electrically connects the signal line 101 and the capacitor C1 by switching to the closed state. The switch element 150$_1$ electrically separates the signal line 101 from the capacitor C1 by switching to the open state. By the signal line 101 and the capacitor C1 being electrically connected to each other, a capacitance value of the capacitor C1 is added to the impedance of the transmission circuit 28. In other words, a reactance component of the impedance of the transmission circuit 28 changes due to the addition of the capacitance value of the capacitor C1.

The capacitor circuit 120$_2$ includes a signal source 140$_2$, a switch element 150$_2$, and a capacitor C2. The signal source 140$_2$ indicates a signal source to which the control signal from the control circuit 27 is supplied. The signal source 140$_2$ outputs the control signal to the switch element 150$_2$ to control an opening/closing operation of the switch element 150$_2$. The switch element 150$_2$ includes one input terminal to which the signal source 140$_2$ is connected and the other input terminal to which the reference potential is connected. The switch element 150$_2$ switches between the closed state and the open state in accordance with the control signal from the signal source 140$_2$.

The switch element 150$_2$ includes one end to which the signal line 101 is electrically connected and the other end to which one end of the capacitor C2 is electrically connected. The other end of the capacitor C2 is connected to the reference potential. In this case, the switch element 150$_2$ electrically connects the signal line 101 and the capacitor C2 by switching to the closed state. The switch element 150$_2$ electrically separates the signal line 101 from the capacitor C2 by switching to the open state. By the signal line 101 and the capacitor C2 being electrically connected to each other, a capacitance value of the capacitor C2 is added to the impedance of the transmission circuit 28. In other words, the reactance component of the impedance of the transmission circuit 28 changes due to the addition of the capacitance value of the capacitor C2.

The capacitor circuit $120_3$ includes a signal source $140_3$, a switch element $150_3$, and a capacitor C3. The signal source $140_3$ indicates a signal source to which the control signal from the control circuit 27 is supplied. The signal source $140_3$ outputs the control signal to the switch element $150_3$ to control an opening/closing operation of the switch element $150_3$. The switch element $150_3$ includes one input terminal to which the signal source $140_3$ is connected and the other input terminal to which the reference potential is connected. The switch element $150_3$ switches between the closed state and the open state in accordance with the control signal from the signal source $140_3$.

The switch element $150_3$ includes one end to which the signal line 101 is electrically connected and the other end to which one end of the capacitor C3 is electrically connected. The other end of the capacitor C3 is connected to the reference potential. In this case, the switch element $150_3$ electrically connects the signal line 101 and the capacitor C3 by switching to the closed state. The switch element $150_3$ electrically separates the signal line 101 from the capacitor C3 by switching to the open state. By the signal line 101 and the capacitor C3 being electrically connected to each other, a capacitance value of the capacitor C3 is added to the impedance of the transmission circuit 28. In other words, the reactance component of the impedance of the transmission circuit 28 changes due to the addition of the capacitance value of the capacitor C3.

The capacitor circuit $120_4$ includes a signal source $140_4$, a switch element $150_4$, and a capacitor C4. The signal source $140_4$ indicates a signal source to which the control signal from the control circuit 27 is supplied. The signal source $140_4$ outputs the control signal to the switch element $150_4$ to control an opening/closing operation of the switch element $150_4$. The switch element $150_4$ includes one input terminal to which the signal source $140_4$ is connected and the other input terminal to which the reference potential is connected. The switch element $150_4$ switches between the closed state and the open state in accordance with the control signal from the signal source $140_4$.

The switch element $150_4$ includes one end to which the signal line 101 is electrically connected and the other end to which one end of the capacitor C4 is electrically connected. The other end of the capacitor C4 is connected to the reference potential. In this case, the switch element $150_4$ electrically connects the signal line 101 and the capacitor C4 by switching to the closed state. The switch element $150_4$ electrically separates the signal line 101 from the capacitor C4 by switching to the open state. By the signal line 101 and the capacitor C4 being electrically connected to each other, a capacitance value of the capacitor C4 is added to the impedance of the transmission circuit 28. In other words, the reactance component of the impedance of the transmission circuit 28 changes due to the addition of the capacitance value of the capacitor C4.

The capacitor circuit $120_5$ includes a signal source $140_5$, a switch element $150_5$, and a capacitor C5. The signal source $140_5$ indicates a signal source to which the control signal from the control circuit 27 is supplied. The signal source $140_5$ outputs the control signal to the switch element $150_5$ to control an opening/closing operation of the switch element $150_5$. The switch element $150_5$ includes one input terminal to which the signal source $140_5$ is connected and the other input terminal to which the reference potential is connected. The switch element $150_5$ switches between the closed state and the open state in accordance with the control signal from the signal source $140_5$.

The switch element $150_5$ includes one end to which the signal line 101 is electrically connected and the other end to which one end of the capacitor C5 is electrically connected. The other end of the capacitor C5 is connected to the reference potential. In this case, the switch element $150_5$ electrically connects the signal line 101 and the capacitor C5 by switching to the closed state. The switch element $150_5$ electrically separates the signal line 101 from the capacitor C5 by switching to the open state. By the signal line 101 and the capacitor C5 being electrically connected to each other, a capacitance value of the capacitor C5 is added to the impedance of the transmission circuit 28. In other words, the reactance component of the impedance of the transmission circuit 28 changes due to the addition of the capacitance value of the capacitor C5.

The capacitor circuit $120_6$ includes a signal source $140_6$, a switch element $150_6$, and a capacitor C6. The signal source $140_6$ indicates a signal source to which the control signal from the control circuit 27 is supplied. The signal source $140_6$ outputs the control signal to the switch element $150_6$ to control an opening/closing operation of the switch element $150_6$. The switch element $150_6$ includes one input terminal to which the signal source $140_6$ is connected and the other input terminal to which the reference potential is connected. The switch element $150_6$ switches between the closed state and the open state in accordance with the control signal from the signal source $140_6$.

The switch element $150_6$ includes one end to which the signal line 101 is electrically connected and the other end to which one end of the capacitor C6 is electrically connected. The other end of the capacitor C6 is connected to the reference potential. In this case, the switch element $150_6$ electrically connects the signal line 101 and the capacitor C6 by switching to the closed state. The switch element $150_6$ electrically separates the signal line 101 from the capacitor C6 by switching to the open state. By the signal line 101 and the capacitor C6 being electrically connected to each other, a capacitance value of the capacitor C6 is added to the impedance of the transmission circuit 28. In other words, the reactance component of the impedance of the transmission circuit 28 changes due to the addition of the capacitance value of the capacitor C6.

The capacitor circuit $120_7$ includes a signal source $140_7$, a switch element $150_7$, and a capacitor C7. The signal source $140_7$ indicates a signal source to which the control signal from the control circuit 27 is supplied. The signal source $140_7$ outputs the control signal to the switch element $150_7$ to control an opening/closing operation of the switch element $150_7$. The switch element $150_7$ includes one input terminal to which the signal source $140_7$ is connected and the other input terminal to which the reference potential is connected. The switch element $150_7$ switches between the closed state and the open state in accordance with the control signal from the signal source $140_7$.

The switch element $150_7$ includes one end to which the signal line 101 is electrically connected and the other end to which one end of the capacitor C7 is electrically connected. The other end of the capacitor C7 is connected to the reference potential. In this case, the switch element $150_7$ electrically connects the signal line 101 and the capacitor C7 by switching to the closed state. The switch element $150_7$ electrically separates the signal line 101 from the capacitor C7 by switching to the open state. By the signal line 101 and the capacitor C7 being electrically connected to each other, a capacitance value of the capacitor C7 is added to the impedance of the transmission circuit 28. In other words, the reactance component of the impedance of the transmission circuit 28 changes due to the addition of the capacitance value of the capacitor C7.

The capacitor circuit $\mathbf{120}_8$ includes a signal source $\mathbf{140}_8$, a switch element $\mathbf{150}_8$, and a capacitor C8. The signal source $\mathbf{140}_8$ indicates a signal source to which the control signal from the control circuit 27 is supplied. The signal source $\mathbf{140}_8$ outputs the control signal to the switch element $\mathbf{150}_8$ to control an opening/closing operation of the switch element $\mathbf{150}_8$. The switch element $\mathbf{150}_8$ includes one input terminal to which the signal source $\mathbf{140}_8$ is connected and the other input terminal to which the reference potential is connected. The switch element 150*g* switches between the closed state and the open state in accordance with the control signal from the signal source $\mathbf{140}_8$.

The switch element $\mathbf{150}_8$ includes one end to which the signal line 101 is electrically connected and the other end to which one end of the capacitor C8 is electrically connected. The other end of the capacitor C8 is connected to the reference potential. In this case, the switch element 150*g* electrically connects the signal line 101 and the capacitor C8 by switching to the closed state. The switch element $\mathbf{150}_8$ electrically separates the signal line 101 from the capacitor C8 by switching to the open state. By the signal line 101 and the capacitor C8 being electrically connected to each other, a capacitance value of the capacitor C8 is added to the impedance of the transmission circuit 28. In other words, the reactance component of the impedance of the transmission circuit 28 changes due to the addition of the capacitance value of the capacitor C8.

The capacitance values of the capacitors C1 to C8 are different from each other. The control circuit 27 selectively controls the switch elements $\mathbf{150}_1$ to $\mathbf{150}_8$. The control circuit 27 can control, by selectively controlling the switch elements $\mathbf{150}_1$ to $\mathbf{150}_8$, the reflection coefficient of an output terminal 102 on the antenna 10 side of the transmission circuit 28 to rotate in the complex plane. In the present disclosure, as will be described later, the control circuit 27 can control, by selectively changing the opening and closing of the switch elements $\mathbf{150}_1$ to $\mathbf{150}_8$, the reflection coefficient of the output terminal 102 on the antenna 10 side of the transmission circuit 28 to rotate in a complex plane and on a circle that is distorted in comparison to a perfect circle.

Figure 5:
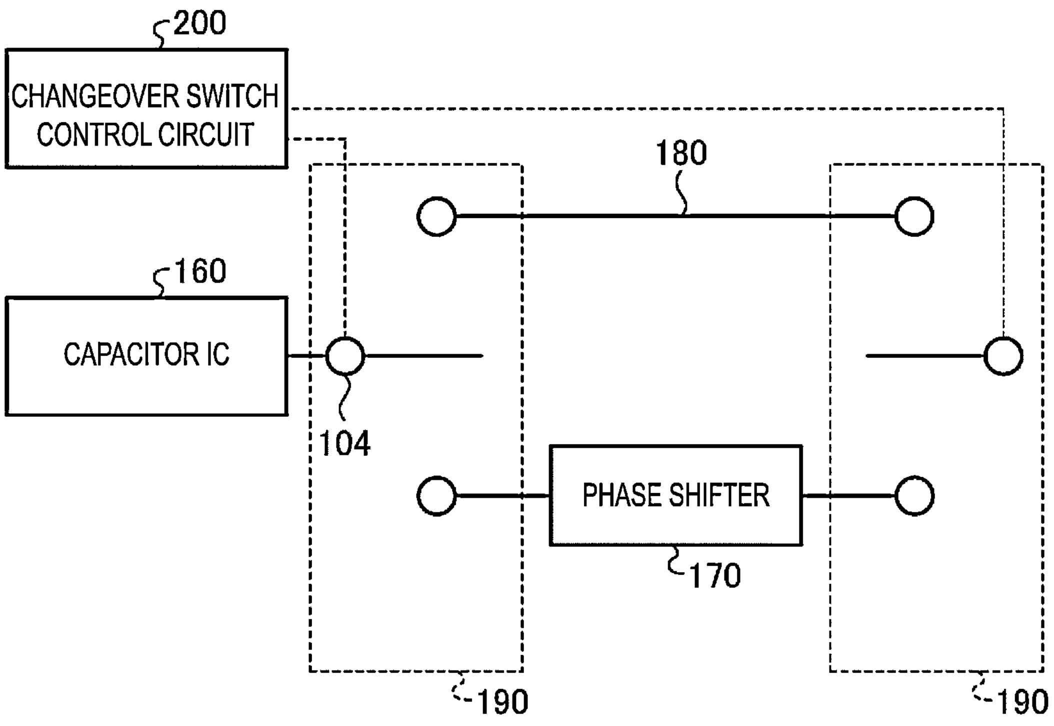
FIG. 5 is a diagram for explaining a method of controlling rotation of a reflection coefficient in the complex plane according to the embodiment.

A method of controlling rotation of impedance in the complex plane according to the embodiment will be described with reference to FIG. 5. FIG. 5 is a diagram for explaining a method of controlling rotation of the reflection coefficient in the complex plane according to the embodiment.

As illustrated in FIG. 5, the transmission circuit 28 illustrated in FIG. 4 may be integrated and used as a capacitor IC 160. In this case, the capacitor IC 160 is connected to either a phase shifter 170 or a signal line 180 by switching of a changeover switch element 190 by a changeover switch control circuit 200.

The phase shifter 170 includes a capacitor, an inductor, and a capacitor, which are not illustrated. The phase shifter 170 shifts a phase of an input signal by 90° and outputs the shifted signal.

For example, when controlling rotation of the impedance between 0° and −90° and between −90° and 180°, the changeover switch control circuit 200 controls the changeover switch element 190 to connect the capacitor IC 160 and the signal line 180.

When controlling rotation of the impedance between 0° and 90° and between 90° and 180°, the changeover switch control circuit 200 controls the changeover switch element 190 to connect the capacitor IC 160 and the phase shifter 170.

As illustrated in FIG. 4, the transmission circuit 28 includes eight of the capacitor circuits 120. Thus, the changeover switch control circuit 200 can control, by switching the connection of the capacitor IC 160 with the phase shifter 170 and the signal line 180, the position of the impedance on the complex plane to be rotated at sixteen points. Note that, in the present embodiment, the control circuit 27 and the changeover switch control circuit 200 may be integrally configured.

Control of Transmission Circuit

Next, a method of controlling the transmission circuit 28 illustrated in FIG. 4 will be described.

Control Method of Comparative Example

Figure 6:
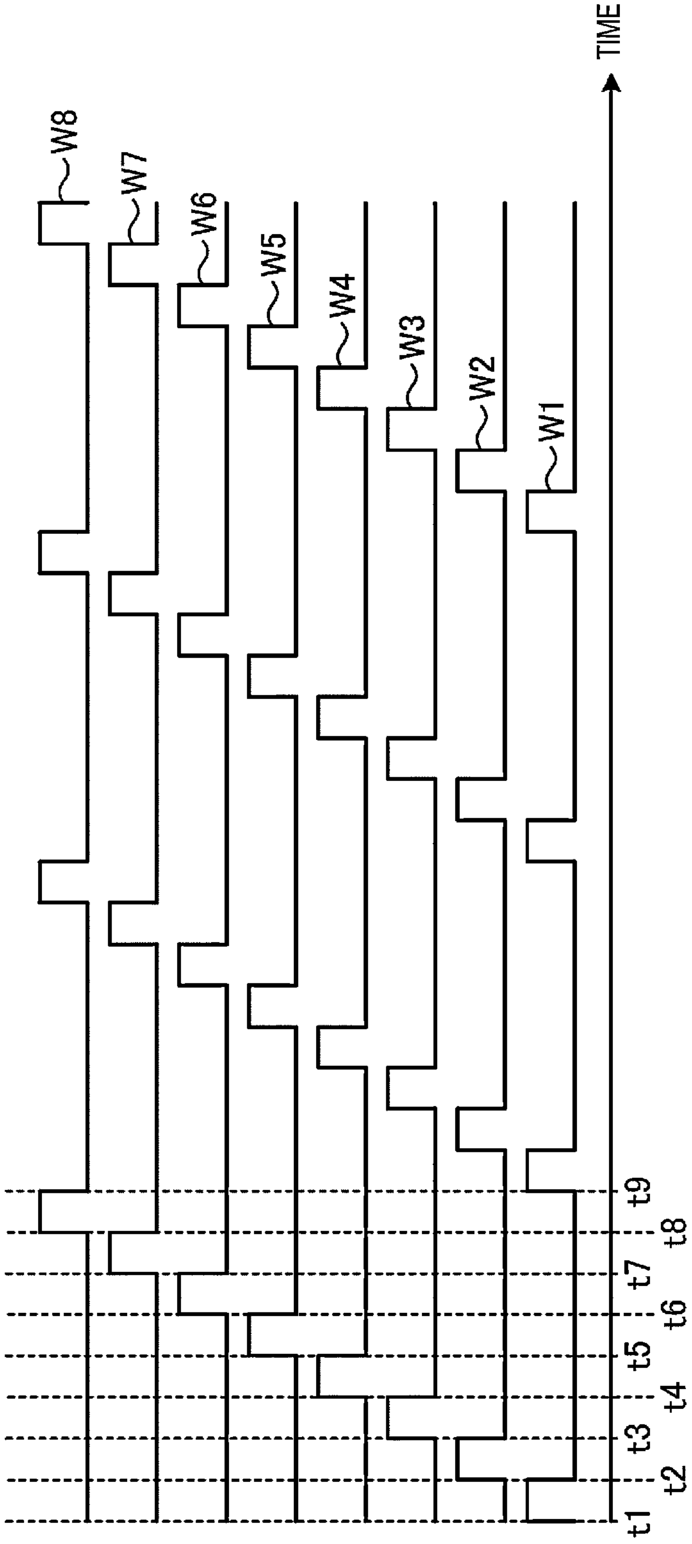
FIG. 6 is a diagram for explaining a method of controlling the transmission circuit according to Comparative Example.

Before describing the embodiment of the present disclosure, a method of controlling the transmission circuit 28 according to Comparative Example will be described with reference to FIG. 6. FIG. 6 is a diagram for explaining the method of controlling the transmission circuit 28 according to Comparative Example.

FIG. 6 illustrates an operating state of each of the switch elements included in the transmission circuit 28. FIG. 6 illustrates a waveform W1, a waveform W2, a waveform W3, a waveform W4, a waveform W5, a waveform W6, a waveform W7, and a waveform W8 of the control signals of the respective switch elements.

The waveform W1 indicates an operating state of the switch element $\mathbf{150}_1$. In Comparative Example, the control circuit 27 controls the switch element $\mathbf{150}_1$ to be in the closed state at a timing t1 and to be in the open state at a timing t2.

The waveform W2 indicates an operating state of the switch element $\mathbf{150}_2$. In Comparative Example, the control circuit 27 controls the switch element $\mathbf{150}_2$ to be in the closed state at the timing t2 and to be in the open state at a timing t3.

The waveform W3 indicates an operating state of the switch element $\mathbf{150}_3$. In Comparative Example, the control circuit 27 controls the switch element $\mathbf{150}_3$ to be in the closed state at the timing t3 and to be in the open state at a timing t4.

The waveform W4 indicates an operating state of the switch element $\mathbf{150}_4$. In Comparative Example, the control circuit 27 controls the switch element $\mathbf{150}_4$ to be in the closed state at the timing t4 and to be in the open state at a timing t5.

The waveform W5 indicates an operating state of the switch element $\mathbf{150}_5$. In Comparative Example, the control circuit 27 controls the switch element $\mathbf{150}_5$ to be in the closed state at the timing t5 and to be in the open state at a timing t6.

The waveform W6 indicates an operating state of the switch element $\mathbf{150}_6$. In Comparative Example, the control circuit 27 controls the switch element $\mathbf{150}_6$ to be in the closed state at the timing t6 and to be in the open state at a timing t7.

The waveform W7 indicates an operating state of the switch element $\mathbf{150}_7$. In Comparative Example, the control circuit 27 controls the switch element $\mathbf{150}_7$ to be in the closed state at the timing t7 and to be in the open state at a timing t8.

The waveform W8 indicates an operating state of the switch element $\mathbf{150}_8$. In Comparative Example, the control circuit 27 controls the switch element 150_g_ to be in the closed state at the timing t8 and to be in the open state at a timing t9.

As illustrated in FIG. 6, the control circuit 27 performs control by switching between the open state and the closed state of each of the switch elements, so that one of the switch elements is always in the closed state.

Control Method of Embodiment

Figure 7:
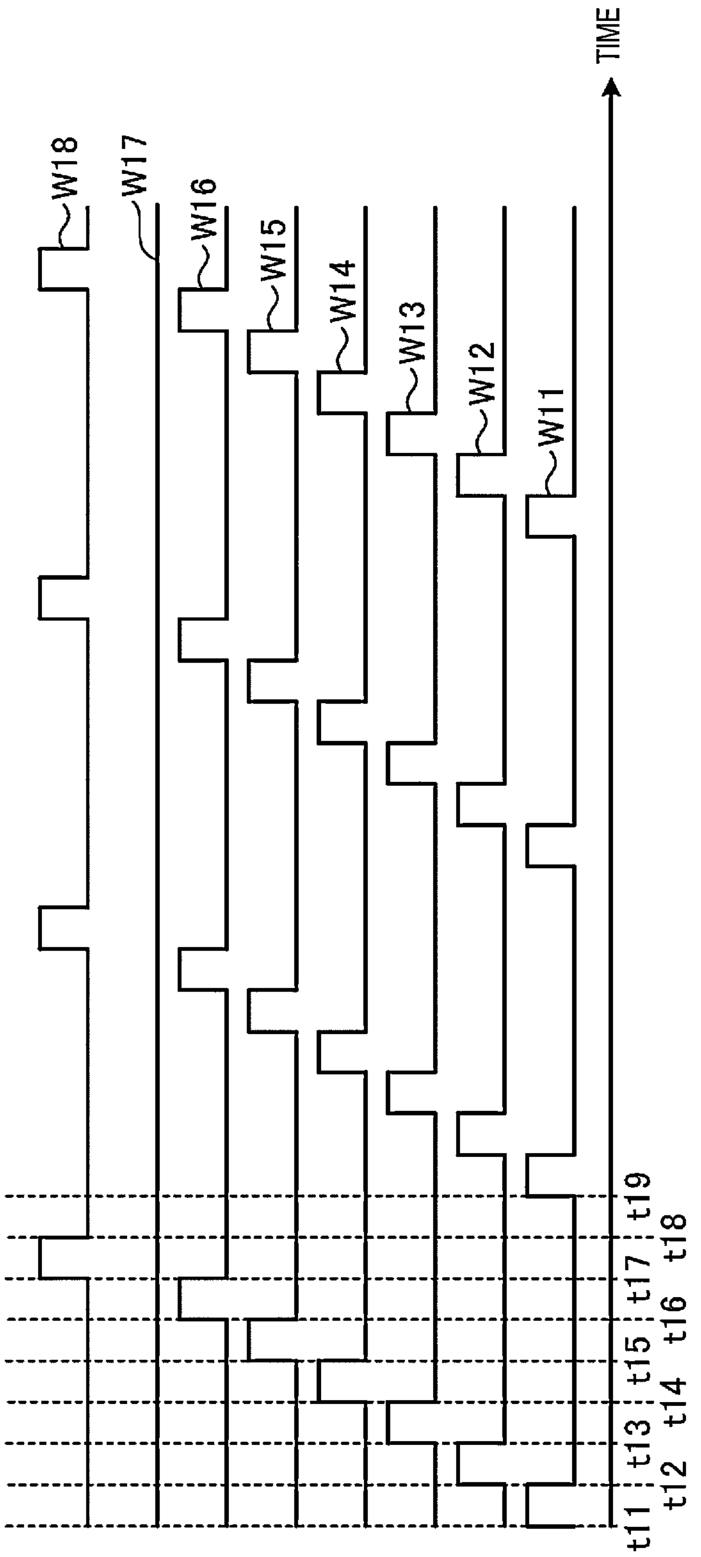
FIG. 7 is a diagram for explaining a method of controlling the transmission circuit according to the embodiment.

A method of controlling the transmission circuit 28 according to the embodiment will be described with reference to FIG. 7. FIG. 7 is a diagram for explaining the method of controlling the transmission circuit 28 according to the embodiment.

FIG. 7 illustrates an operating state of each of the switch elements included in the transmission circuit 28. FIG. 7 illustrates a waveform W11, a waveform W12, a waveform W13, a waveform W14, a waveform W15, a waveform W16, a waveform W17, and a waveform W18 of the control signals of the respective switch elements.

The waveform W11 indicates an operating state of the switch element $\mathbf{150}_1$. In the embodiment, the control circuit 27 controls the switch element $\mathbf{150}_1$ to be in the closed state at a timing t11 and to be in the open state at a timing t12.

The waveform W12 indicates an operating state of the switch element $\mathbf{150}_2$. In the embodiment, the control circuit 27 controls the switch element $\mathbf{150}_2$ to be in the closed state at the timing t12 and to be in the open state at a timing t13.

The waveform W13 indicates an operating state of the switch element $\mathbf{150}_3$. In the embodiment, the control circuit 27 controls the switch element $\mathbf{150}_3$ to be in the closed state at the timing t13 and to be in the open state at a timing t14.

The waveform W14 indicates an operating state of the switch element $\mathbf{150}_4$. In the embodiment, the control circuit 27 controls the switch element $\mathbf{150}_4$ to be in the closed state at the timing t14 and to be in the open state at a timing t15.

The waveform W15 indicates an operating state of the switch element $\mathbf{150}_5$. In the embodiment, the control circuit 27 controls the switch element $\mathbf{150}_5$ to be in the closed state at the timing t15 and to be in the open state at a timing t16.

The waveform W16 indicates an operating state of the switch element $\mathbf{150}_6$. In the embodiment, the control circuit 27 controls the switch element $\mathbf{150}_6$ to be in the closed state at the timing t16 and to be in the open state at a timing t17.

The waveform W17 indicates an operating state of the switch element $\mathbf{150}_7$. As indicated by the waveform W17, in the embodiment, the switch element $\mathbf{150}_7$ is always in the open state. That is, in the embodiment, the control circuit 27 does not cause the switch element $\mathbf{150}_7$ to be in the closed state. That is, in the embodiment, the capacitor C7 connected to the switch element $\mathbf{150}_7$ is not added to the transmission circuit 28. In other words, in the embodiment, the control circuit 27 controls each of the switch elements so that not all of the capacitors included in the transmission circuit 28 are used but at least one of all of the capacitors is not used. For example, the control circuit 27 selects the switch element 150 not to be controlled, so that the changes in the impedance on the complex plane, which occur as a result of controlling each of the switch elements, occur at equal intervals.

The waveform W18 indicates an operating state of the switch element 150_g_. In the embodiment, the control circuit 27 controls the switch element $\mathbf{150}_8$ to be in the closed state at the timing t17 and to be in the open state at a timing t18.

As illustrated in FIG. 7, all of the switch elements are in the open state during a period from when the switch element $\mathbf{150}_8$ is switched to the open state at the timing t18 to when the switch element $\mathbf{150}_1$ is switched to the closed state at the timing t19. In the embodiment, by providing the period in which all of the switch elements are in the open state, the radius of the circle when controlling rotation of impedance is changed in the complex plane. In other words, the embodiment provides the period in which all of the switch elements are in the open state, and thus the impedance can be controlled to rotate in a complex plane and on the circle that is distorted in comparison to the perfect circle.

For example, when all of the plurality of switch elements are used (Comparative Example), when the radius of the circle of the reflection coefficient of the output terminal on the antenna side is defined as X, the control circuit 27 according to the embodiment controls the plurality of switch elements and thus causes the radius of the circle of the reflection coefficient to be X or more and X+0.2 or less.

Figure 8:
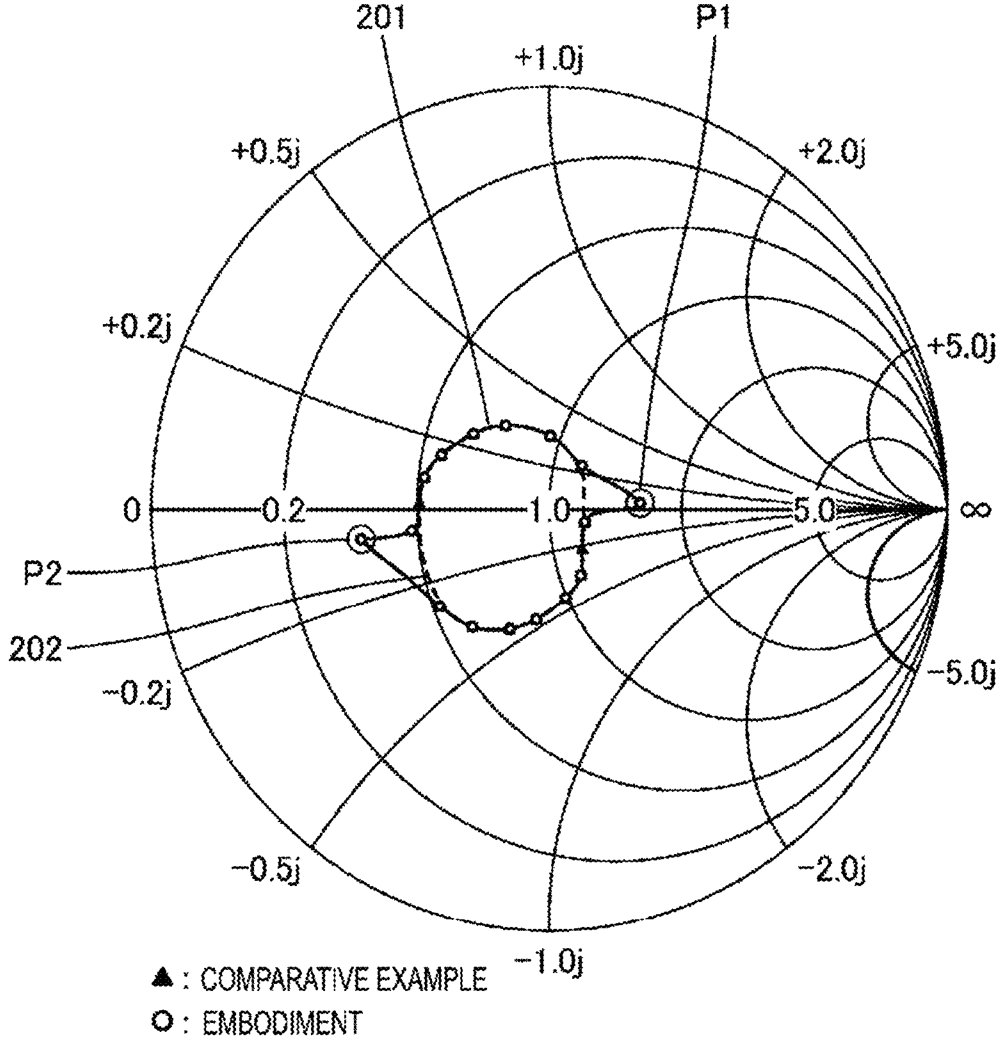
FIG. 8 is a diagram for explaining a method of controlling rotation of impedance of an output terminal on an antenna side of the transmission circuit according to the embodiment.

A method of controlling rotation of impedance of the output terminal on the antenna side of the transmission circuit according to the embodiment will be described with reference to FIG. 8. FIG. 8 is a diagram for explaining the method of controlling rotation of impedance of the output terminal on the antenna side of the transmission circuit according to the embodiment.

FIG. 8 illustrates changes in the impedance when viewed from the output terminal on the antenna side of FIG. 5, in the Smith chart. A graph 201 is a graph showing changes in the impedance according to the embodiment. A graph 202 is a graph showing changes in the impedance according to Comparative Example.

As indicated by the graph 202, in Comparative Example, the impedance changes so as to rotate on a circle in the Smith chart. As indicated by the graph 201, in the embodiment, the impedance changes so as to rotate on a circle that is distorted in comparison to that of Comparative Example. In the graph 201, a point P1 and a point P2 deviating from the circular orbit indicate impedances when all of the switch elements in the transmission circuit 28 are in the open state.

Backscatter Signal

Figure 9:
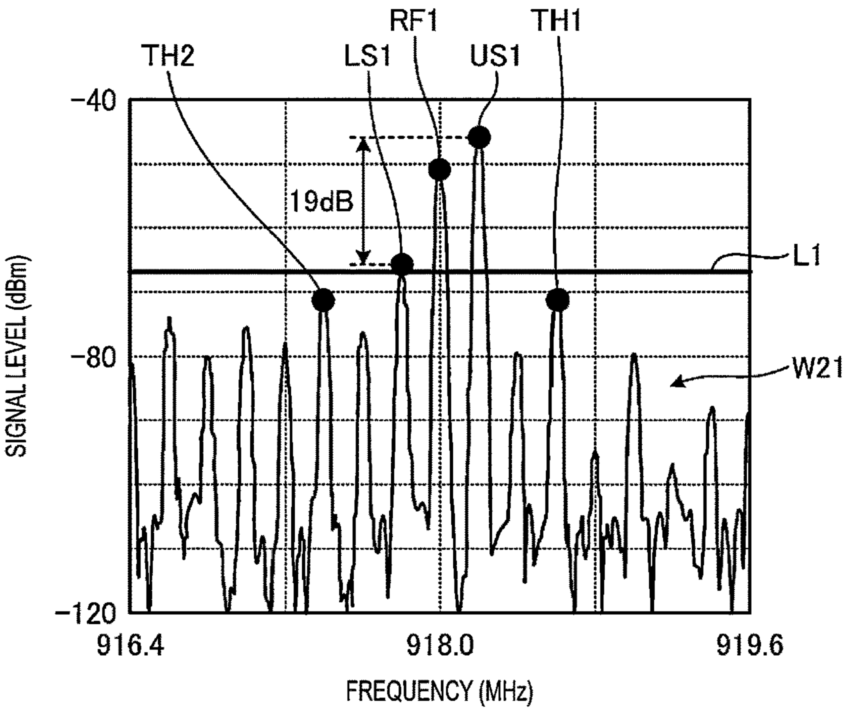
FIG. 9 is a diagram illustrating an example of a spectrum waveform of the backscatter signal according to Comparative Example.
Figure 10:
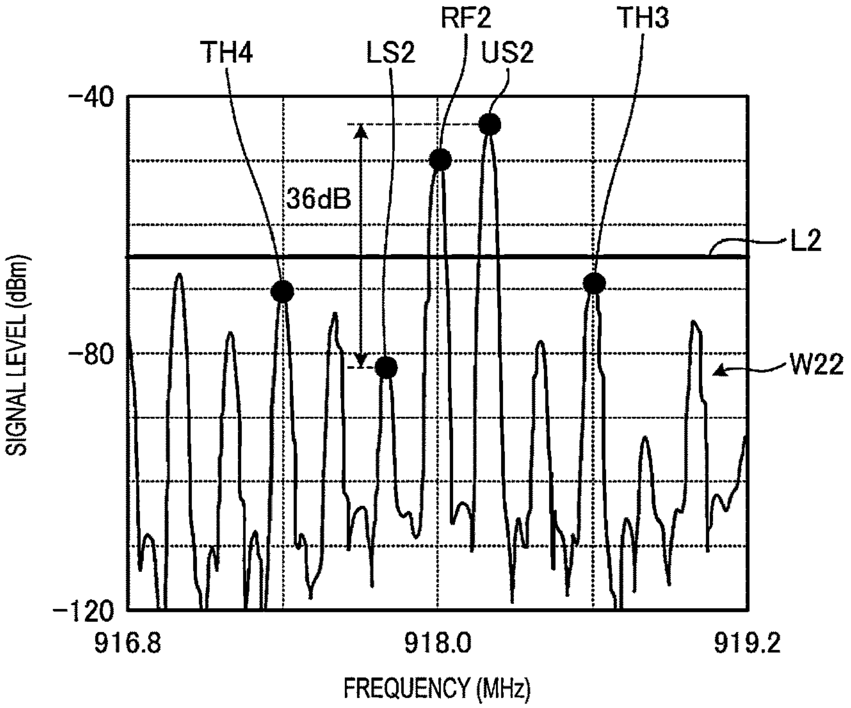
FIG. 10 is a diagram illustrating an example of the spectrum waveform of the backscatter signal according to the embodiment.

Examples of the backscatter signal according to Comparative Example and the embodiment will be described with reference to FIGS. 9 and 10. FIG. 9 is a diagram illustrating an example of a spectrum waveform of the backscatter signal according to Comparative Example. FIG. 10 is a diagram illustrating an example of the spectrum waveform of the backscatter signal according to the embodiment. In FIGS. 9 and 10, the horizontal axis represents the frequency (megahertz (MHz)), and the vertical axis represents the signal level (decibel-milliwatt (dBm)).

FIG. 9 illustrates a spectrum waveform W21 according to Comparative Example. The spectrum waveform W21 includes a carrier signal RF1, a USB signal US1, an LSB signal LS1, a third harmonic signal TH1, and a third harmonic signal TH2. The frequency of the carrier signal RF1 is 918 (MHz). The frequency of the LSB signal LS1 is 917.8 (MHz). The frequency of the USB signal US1 is 918.2 (MHz). As illustrated in FIG. 9, the LSB signal LS1 is suppressed compared with the USB signal US1. A difference between the USB signal US1 and the LSB signal LS1 is approximately 19 (decibel (dB)). A line L1 indicates a signal level of −20 (dB) with respect to the USB signal US1. The third harmonic signal TH1 and the third harmonic signal TH2 are −20 (dB) or less.

FIG. 10 is a diagram illustrating an example of a spectrum waveform W22 according to the embodiment. The spectrum waveform W22 includes a carrier signal RF2, a USB signal US2, an LSB signal LS2, a third harmonic signal TH3, and a third harmonic signal TH4. The frequency of the carrier signal RF2 is 918 (MHz). The frequency of the LSB signal LS2 is 917.8 (MHz). The frequency of the USB signal US2 is 918.2 (MHz). As illustrated in FIG. 10, the LSB signal LS2 is suppressed compared with the USB signal US2. A difference between the USB signal US2 and the LSB signal LS2 is approximately 36 [dB (decibel)]. A line L2 indicates a signal level of −20 (dB) with respect to the USB signal US2. The third harmonic signal TH3 and the third harmonic signal TH4 are −20 (dB) or less. That is, since the difference between the USB signal US2 and the LSB signal LS2 in the embodiment is larger than the difference between the USB signal US1 and the LSB signal LS1 illustrated in FIG. 9, the characteristics are improved.

An embodiment of the present disclosure has been described above, but the present disclosure is not limited by the contents of the embodiment. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiment.

REFERENCE SIGNS

1 Wireless communication device
10 Antenna
11 BPF
20 RFBS device
21 Radio frequency switch
22 Amplifier
23 Demodulator
24 Oscillator
25, 26 LPF
27 Control circuit
28 Transmission circuit
30 Control device
40 Sensor
120 Capacitor circuit
140 Signal source
150 Switch element
160 Capacitor IC
170 Phase shifter
190 Changeover switch element
200 Changeover switch control circuit

The invention claimed is:

1. A transmission circuit configured to be connected to an antenna, the transmission circuit comprising:
a plurality of impedance circuits having an impedance different from each other;
a plurality of switch elements, each of which is connected to a corresponding one of the plurality of impedance circuits; and
a control circuit configured to control opening and closing of the plurality of switch elements, wherein
the control circuit can control, by selectively changing the opening and closing of the plurality of switch elements, a reflection coefficient of an output terminal on a side of the antenna to rotate in a complex plane and on a circle that is distorted in comparison to a perfect circle.

2. The transmission circuit according to claim 1, wherein the control circuit controls the reflection coefficient of the output terminal on the side of the antenna by not using at least one of the plurality of switch elements.

3. The transmission circuit according to claim 1, wherein the control circuit controls the plurality of switch elements and thus causes a radius of the circle of the reflection coefficient to be X or more and X+0.2 or less, where X is a radius of the circle of the reflection coefficient of the output terminal on the side of the antenna when all of the plurality of switch elements are used.

4. The transmission circuit according to claim 1, wherein the control circuit controls the plurality of switch elements and thus provides a period in which all of the plurality of switch elements are in an open state.

5. The transmission circuit according to claim 1, wherein the plurality of impedance circuits include a plurality of capacitor circuits configured to adjust capacitance among reactance components of the impedance.

* * * * *